US007152171B2

(12) United States Patent
Chandley et al.

(10) Patent No.: US 7,152,171 B2
(45) Date of Patent: Dec. 19, 2006

(54) TASK-ORIENTED PROCESSING AS AN AUXILIARY TO PRIMARY COMPUTING ENVIRONMENTS

(75) Inventors: Adrian M. Chandley, Sammamish, WA (US); Chad L. Magendanz, Issaquah, WA (US); Christopher Allen Schoppa, Redmond, WA (US); Dale C. Crosier, Kirkland, WA (US); Jason Michael Anderson, Snoqualmie, WA (US); Juan J. Perez, Seattle, WA (US); Kenneth W. Stufflebeam, Jr., Monroe, WA (US); Pasquale DeMaio, Bellevue, WA (US); Steven T. Kaneko, Medina, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 10/834,322

(22) Filed: Apr. 28, 2004

(65) Prior Publication Data
US 2005/0246563 A1    Nov. 3, 2005

(51) Int. Cl.
*G06F 1/26*        (2006.01)
*G06F 1/00*        (2006.01)
(52) U.S. Cl. ...................... 713/320; 713/300
(58) Field of Classification Search .................. None
See application file for complete search history.

(56) References Cited

U.S. PATENT DOCUMENTS

| 5,142,684 | A | * | 8/1992 | Perry et al. | .................. 713/320 |
| 6,501,999 | B1 | * | 12/2002 | Cai | ............................ 700/82 |
| 6,986,066 | B1 | * | 1/2006 | Morrow et al. | ............. 713/320 |
| 2001/0006884 | A1 | * | 7/2001 | Matsumoto | ..................... 455/1 |
| 2002/0066048 | A1 | * | 5/2002 | Cheng | ......................... 713/330 |

OTHER PUBLICATIONS

Armstrong, J. et al., "A Common Multi-Platform Harddware Object Model", IBM, 1-5.
Arden, B.W. et al., "A Multi-Microprocessor Computer System Architecture", Princeton University, 114-121.

* cited by examiner

*Primary Examiner*—Lynne H. Browne
*Assistant Examiner*—Stefan Stoynov
(74) *Attorney, Agent, or Firm*—Woodcock Washburn LLP

(57) ABSTRACT

A computing system that incorporates an auxiliary processor to the main system processor. The auxiliary system utilizes a separate application runtime for processes and is capable of operating even when the primary system is in an off state. Methods for load-balancing are provided based on computing needs respective to power consumption requirements. Processes that are not computationally intensive are processed by a low-power, auxiliary processor. In addition, peripheral components accessible to the overall computing system are shared.

11 Claims, 9 Drawing Sheets

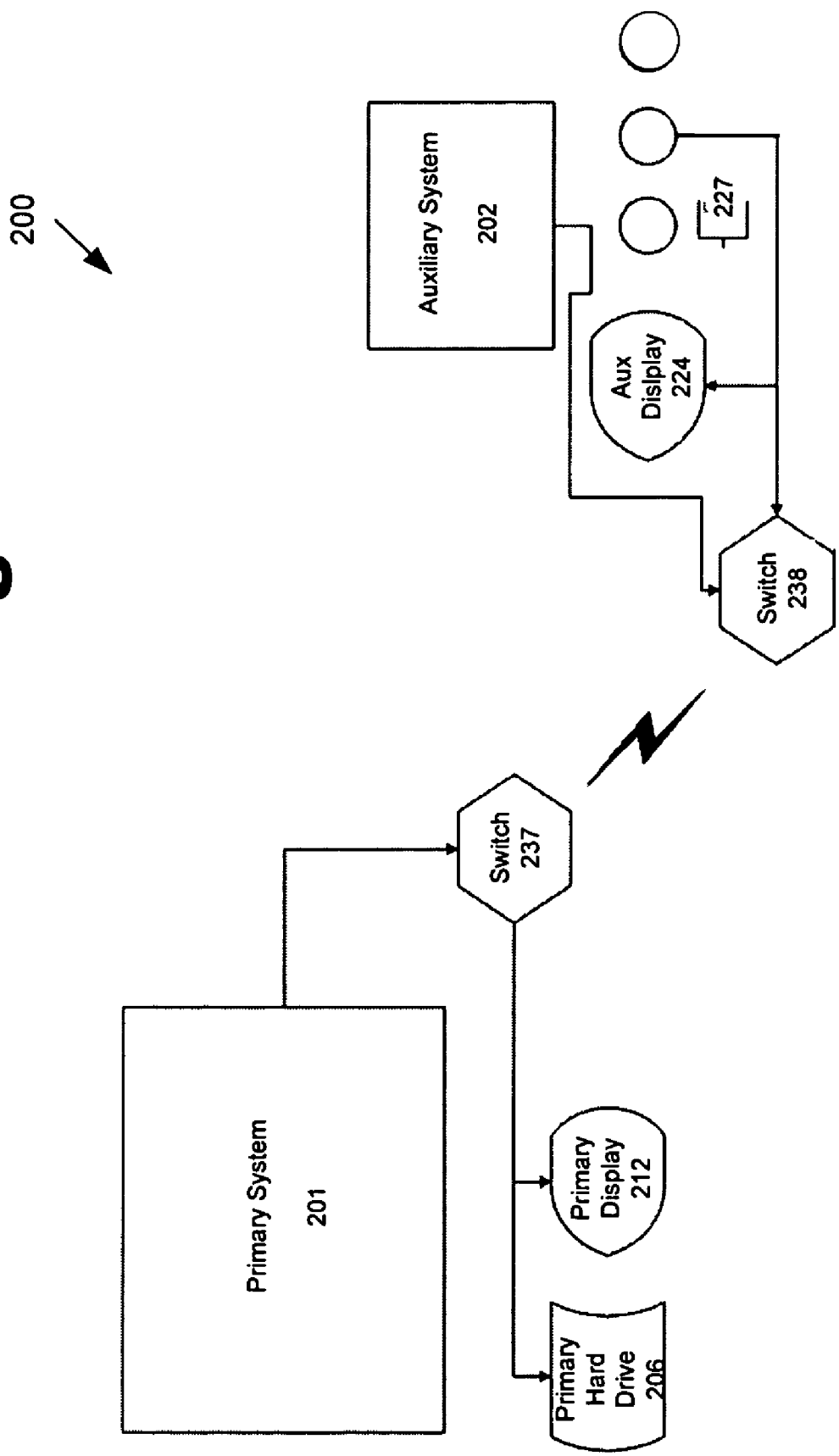

TASK-ORIENTED PROCESSING AS AN AUXILIARY TO PRIMARY COMPUTING ENVIRONMENTS

FIELD OF THE INVENTION

This invention generally relates to the field of computing devices. More particularly, this invention relates to a computing system that incorporates an auxiliary processor to run applications while a primary computing system is in an off or unavailable state.

BACKGROUND OF THE INVENTION

Conventional computing systems only provide utility when they are in a "powered on" state, that is the computing system is up and operating. Thus, when a computing system is in an off state or a standby (low power) mode, the computing system is unavailable and unable to perform processing.

Users or automated tasks, such as periodic updates of information, often desire immediate interaction with a computing device. However, a severe drawback of the conventional computing device is the time it takes for it to become available when the computing device is not on. Conventional systems that are off, in a standby mode, or experiencing faults are not ready for use and must be booted, or awakened from the standby mode, or rebooted to clear the fault. The boot/awakening process may vary from a few seconds to tens of seconds. One solution is to leave the computing device in an on state. However, this leads to increased energy consumption and computing devices that are in an on state generate heat and acoustic emissions, which may not be acceptable in many environments.

Another drawback of conventional portable devices is that they can be cumbersome on inconvenient to prepare for use. For example a laptop may need to be taken out of a bag, and unfolded to gain access to information. It would be beneficial if such devices included an edge mounted, or other auxiliary display, that could be glanced at while still in the bag, and certainly would not require the laptop to be opened.

In addition to the above, conventional computing systems are now being used to implement features that have traditionally been implemented in stand-alone devices. For example, conventional computing systems are being used to implement digital video recorders (DVR), audio playback, telephony, etc. The addition of these features requires that the computing system is available 24 hours a day/7 days a week because the system may be asked at any time to record a television show, playback music or attend to an incoming or outgoing telephone call.

Thus, there is a need for a system and method of providing a computing system that can be placed in a low power state, while remaining able to process low intensity tasks. The present invention provides such a solution.

SUMMARY OF THE INVENTION

The present invention is directed to a computing system that includes an auxiliary microprocessor in addition to the system's central processing unit. The auxiliary microprocessor may also be integrated with the system central processor where both an integrated or external auxiliary microprocessor are provided access to components in a similar fashion. The auxiliary system utilizes a separate application runtime for processes and is capable of operating even when the primary system is in an "off" state. Methods may be provided for load-balancing based on computing needs respective to power consumption requirements. Processes that are not computationally intensive, for example, are sent to the lower-power, auxiliary system.

Notifications, data, and commands can be sent between processes operating under control of the separate processors via common connection buses such as USB. In addition, components accessible to the overall computing system, including displays, indicators, storage devices and I/O components, can be shared between the auxiliary and main system. The present invention provides for a scalable processing capability which significantly reduces overall power consumption.

In accordance with the present invention, there is provided a computing system that includes a primary computing system having a first CPU and a first memory, an auxiliary computing system having a second CPU or other logic device and a second memory, a power supply connected to the primary and auxiliary computing systems, and a communication controller that switches predetermined ones of peripheral components between the primary computing system and the auxiliary computing system such that the components are shared between the primary computing system and the auxiliary computing system.

In accordance with another aspect of the invention, there is provided a method of load-balancing of services based on processing power consumption requirements in a computing system having a primary computing system and an auxiliary computing system. The method includes determining a current system load on a primary system, referencing a list of components, and determining a power consumption requirement of an application to be executed. If the application is a low intensity task, processing of the application is performed by the auxiliary computing system, and if the application is a high intensity task, processing of the application is performed by the primary computing system.

In accordance with yet another aspect of the invention, there is provided a system for asymmetrical computing that includes a primary computing system having a high-power CPU and a first memory, an auxiliary computing system having a low-power CPU and a second memory, a power supply connected to the primary and auxiliary computing systems, peripheral components that communicate to the primary computing system and the auxiliary computing system, and a communication controller that switches predetermined ones of the peripheral components between the primary computing system and the auxiliary computing system such that the components are shared between the primary computing system and the auxiliary computing system.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 9 is a block diagram of a system to share components using a distributed switch.

DETAILED DESCRIPTION OF PREFERRED EMBODIMENTS

A Convention Personal Computer

Figure 1:
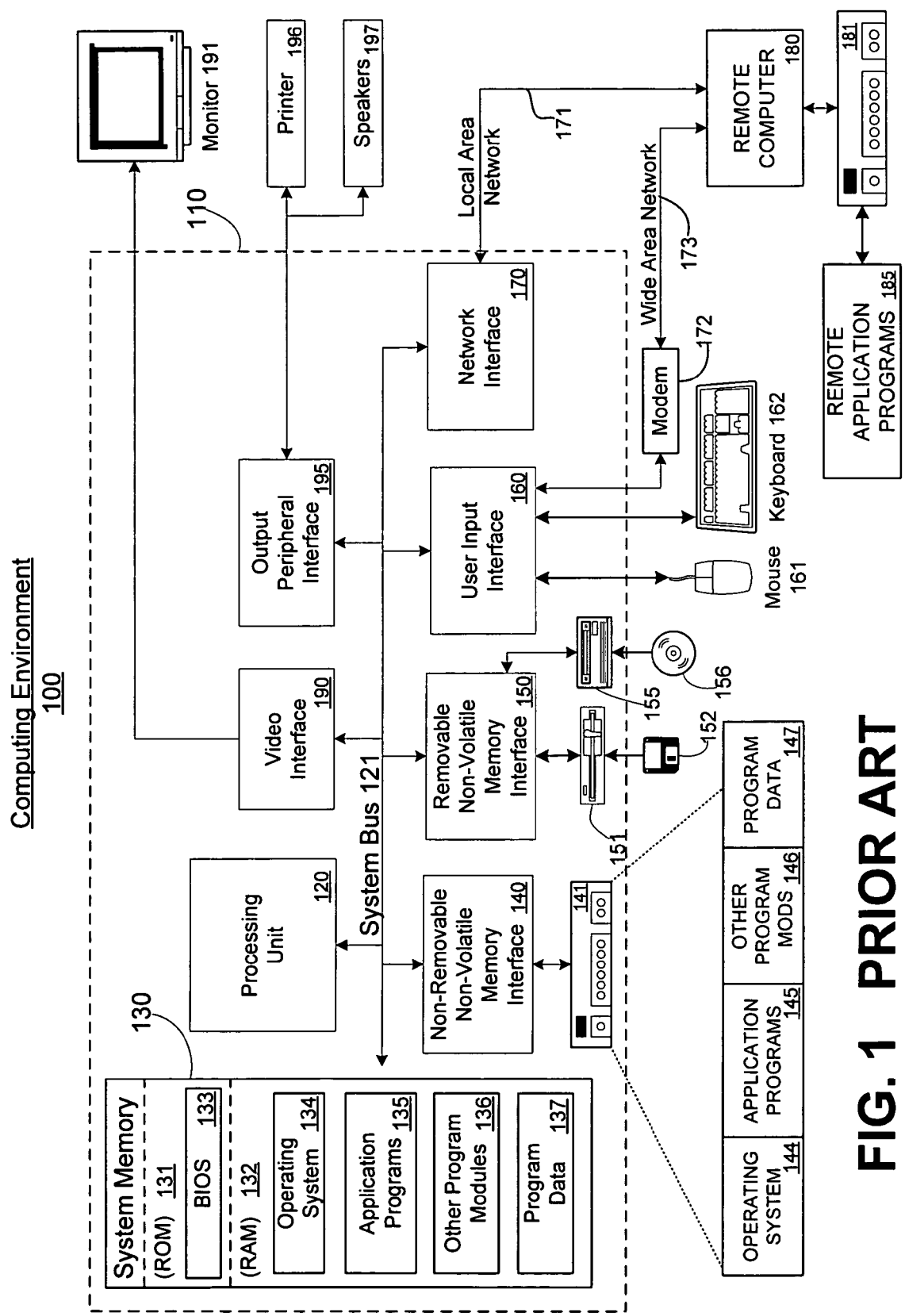
FIG. 1 is a block diagram showing a conventional personal computer.

FIG. 1 illustrates an example of a conventional personal computer system environment 100. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus), Peripheral Component Interconnect Express (PCI-Express), and Systems Management Bus (SM-Bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary System for Providing Auxiliary and Primary Computing Environments.

Figure 2:
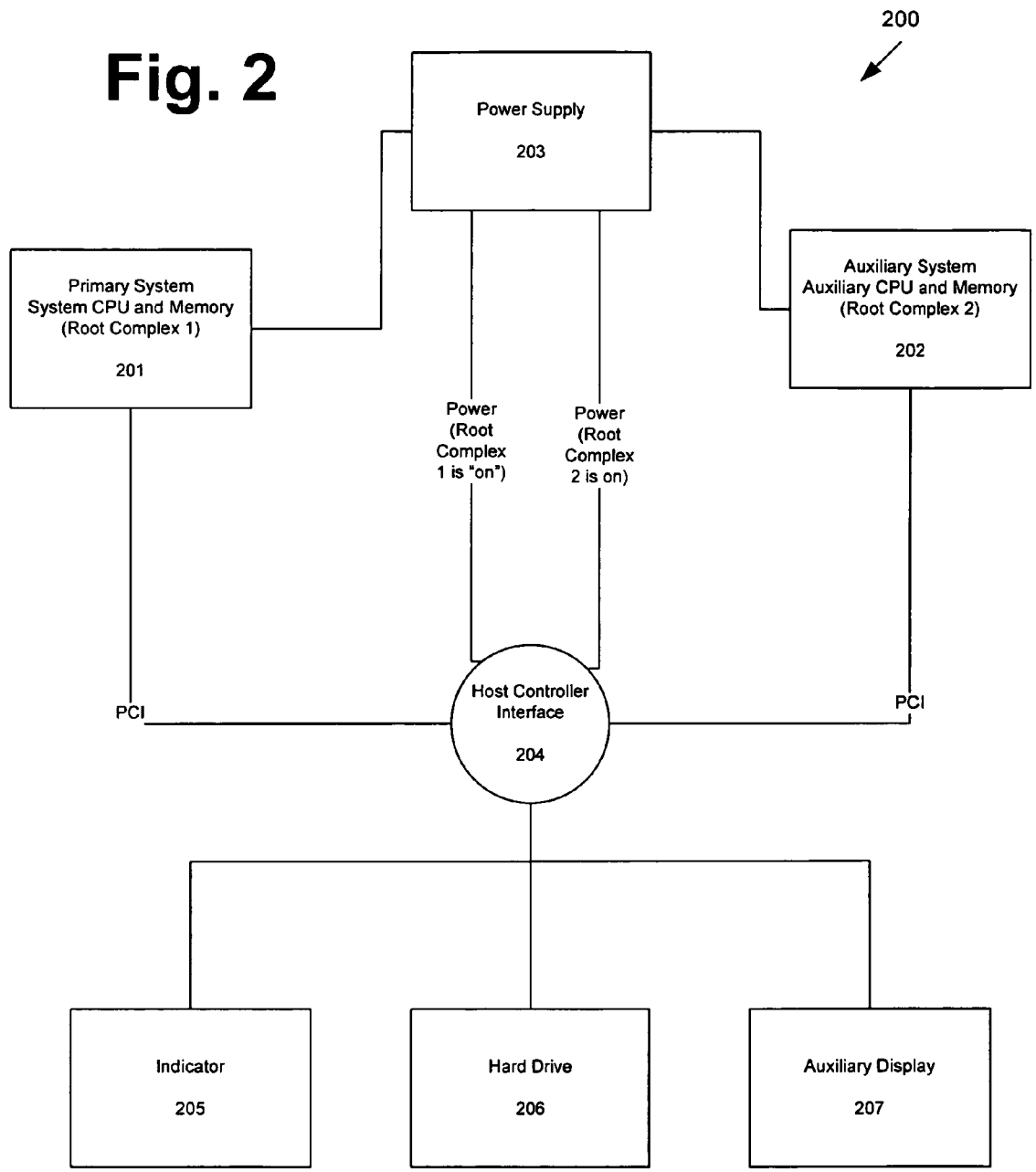
FIG. 2 is a block diagram of a general system to share components based on a power state of a primary or auxiliary system.
Figure 3:
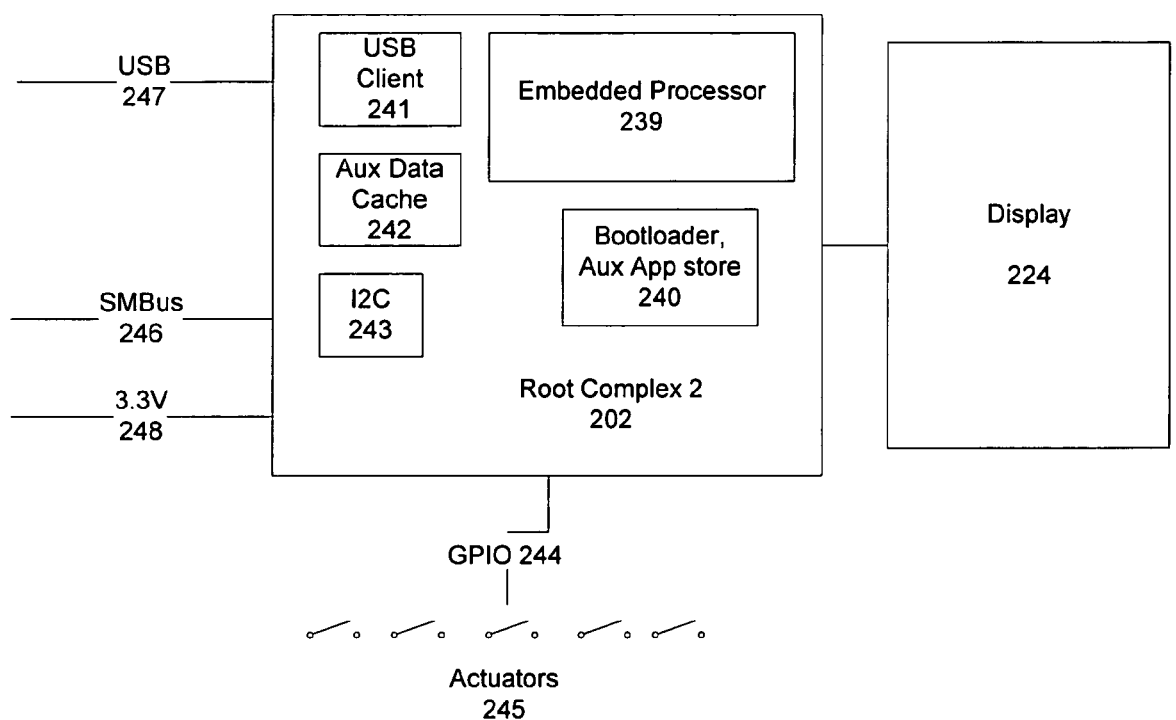
FIG. 3 is a block diagram showing an auxiliary processor component as a separately powered USB peripheral to the primary computing device.

Referring now to FIGS. 2 and 3, there is illustrated an overview of a system 200 for sharing components based on a power state of either a primary or auxiliary system. The system 200 includes a first root complex (primary system) 201 having a primary CPU and memory. The primary system is analogous to the conventional computer 110, as it has a sufficiently high processing power to handle complex tasks. A second root complex (auxiliary system) 202 includes an auxiliary (low-power) CPU and a memory. The auxiliary system 202 may be a low power device, having a smaller amount of processing power, analogous to a PDA. Both root complexes may be powered by a power supply 208 that provides a switched power source to the primary system 201 and the auxiliary system 202.

FIG. 3 illustrates an exemplary implementation of the auxiliary system 202. The auxiliary system 202 includes an embedded processor 239, bootloader/application store 240, a USB client 241, an auxiliary data cache 242 that acts as a non-volatile store, and an I2C communication connection 243. The auxiliary system 202 may receive inputs via USB 247, SMBus 246 and a General Purpose Input Output (GPIO) 244 (via actuators 245). A display 224 may also be provided.

Using the architectures of FIGS. 2 and 3, applications can operate on either processing system 201 or 202 (i.e., primary or secondary root complex, auxiliary system) separate from power state of each system. In addition either processing system, primary 201 or auxiliary 202, can signal to the other for wake and sleep events via system command buses such as SMBus 246. Finally, if both systems are operating, processes on either system can communicate with each other, sending notifications, and data over common buses such as USB. In this model the primary system treats the auxiliary system as a USB peripheral.

In addition to the above, components of the overall computing system can be shared. The auxiliary system 202 utilizes its own separate application runtime for processes, that allows the auxiliary system to run applications that match scenarios to be accomplished while the primary system 201 is in an "off" or "unavailable" state. The power supply 208 provides an output to a host controller interface 204 to indicate that a particular complex is in an on state. The host controller interface then switches control of peripherals, such as an indicator 205, hard drive 206, an auxiliary display 207, etc., between the primary system 201 and auxiliary system 202, to the system that is powered on.

The present invention improves upon this architecture by providing sharing of any component physically part of the system 200 or remotely located and accessible by the system 200. In a typical PC architecture, components such as storage, primary and auxiliary displays, actuators, hardware media components (TV tuner, mpeg encode/decoder, etc.), peripherals etc. are accessed and controlled solely by the primary CPU and runtime. If any of the components are shared with other external computing systems, it is through network shares. There is also no mechanism that enables components on a PC such as hard drives, USB driven components and peripherals, primary and auxiliary displays, etc. to be made available for use by a second system (on or off board) when the primary CPU and operating system is "off".

Figure 4:
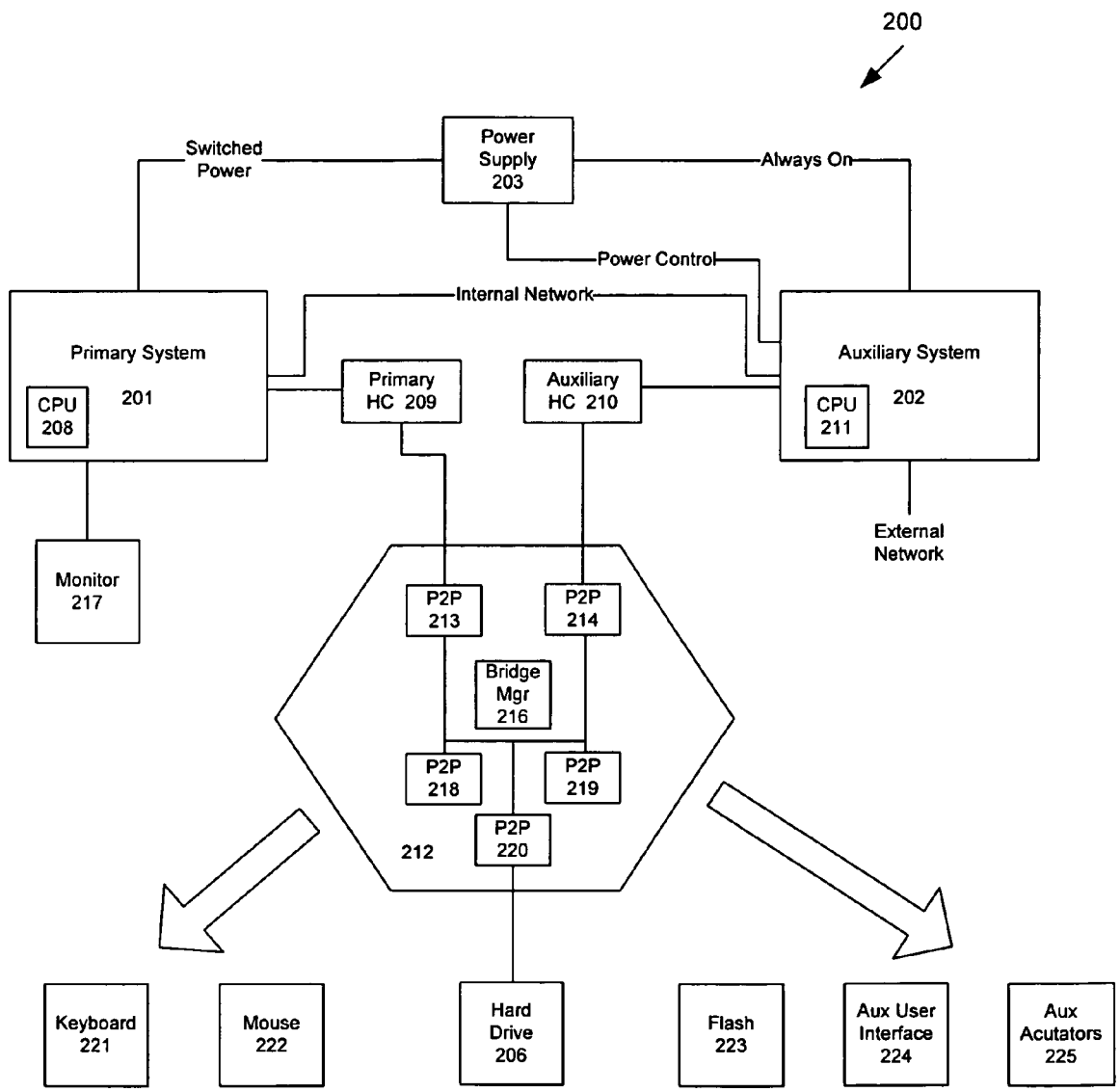
FIG. 4 is a block diagram of a system to share components using a PCI Express switching element.

The present invention provides embodiments for which components on a motherboard (or otherwise connected) can be owned, accessed, and/or shared between processors and operating systems regardless of the apparent "on/off" state of whichever CPU "owns" the component. Referring to FIG. 4, there is illustrated an embodiment of the present invention that enables sharing of components and resources between the primary system 201 having a primary processor 208, and the auxiliary system 202 having an auxiliary processor 211. The primary and auxiliary processors are asymmetrical in the present invention. Each system includes its own host controller (primary host controller 209 and auxiliary host controller 210) to communicate with downstream devices. The primary system 201 may have a monitor 217 as a display.

A "smart" PCI Express switch 212 includes two upstream P2P bridges 213 and 214, each with its independent internal PCI bus and multiple downstream P2P bridges 218, 219 and 220. Each downstream P2P bridge connects to each internal PCI bus. Unlike a conventional PCI Express switch, each downstream P2P bridge has the ability to be configured to respond to the enumeration exercises of either internal PCI bus. A bridge manager 216 contains an internal configuration control register to define the downstream P2P bridge to which each upstream bus is to respond to. Communications from other PCI buses are ignored.

As noted above, the PCI Express switch 212 can switch any component between the two systems 201 and 202. As illustrated, a keyboard 221, mouse 222, the hard drive 206, flash memory 223, an auxiliary user interface (display) 224 and auxiliary actuators 225 may be switched between the systems. This list is not intended to be an exhaustive list, as other components may be attached and switched between the systems 201 and 202.

Thus, according to the present invention, both root complexes 201 and 202 are connected to upstream ports (e.g., P2P 213 and P2P 214) in the switch 212. As such, all downstream components can be access by either root complex.

In addition, the smart PCI Switch enables simultaneous sharing of components. This way a primary and auxiliary systems and runtimes can both write data to the auxiliary 224, regardless of whether the display was physically "part"

of the primary system's component set or the auxiliary system's. Similarly, digital media could be streamed through audio components regardless of which downstream port the audio components were connected.

ACPI power management is handled separately by the root complexes. When the primary system 201 goes into an "off" state, it sends an ACPI event to all of its known components. Those components downstream from the smart PCI switch 212, on the internal LAN, or smart USB hub (described below) stay on, as long as the other root complex (i.e., the auxiliary system 202) is on. In addition, some components have very poor power management constraints. For example, USB components typically cannot be placed in a standby state and must be completely turned off if the primary system 201 enters a standby mode. In accordance with the present invention, these devices can be managed by the auxiliary processor 211 when the primary processor 208 enters a standby or off state to enable a level of power management in these devices.

Figure 5:
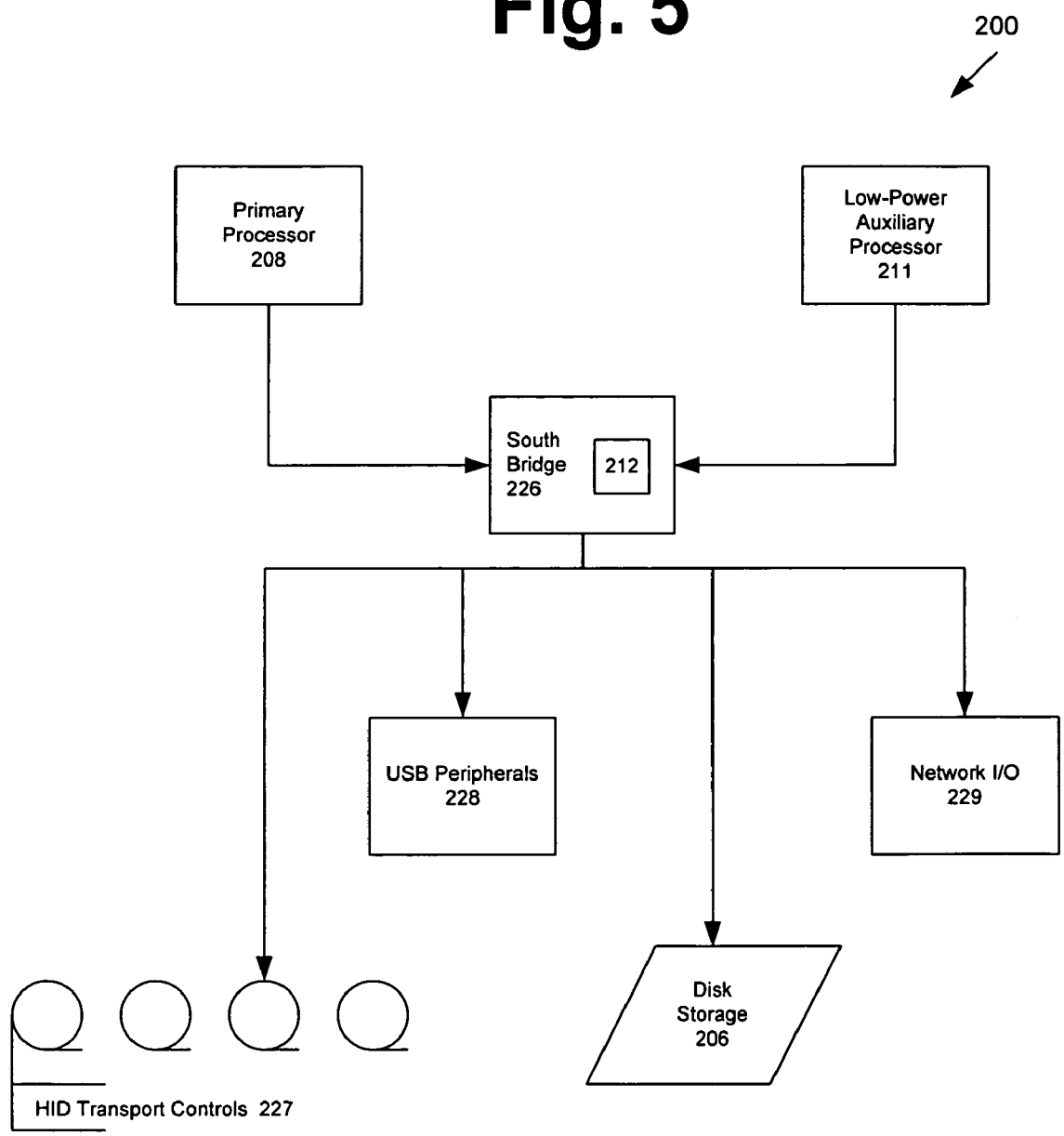
FIG. 5 is a block diagram of a system to share components wherein the PCI Express switching element is contained in a southbridge chip set.

FIG. 5 illustrates as an overview that the PCI Express switch 212 could be hosted in, e.g. in the southbridge chip set. As is know to those of ordinary skill in the art, the southbridge chip set communicates to, e.g., network I/O devices 229, disk storage (e.g., hard disk 206), USB peripherals 228 and HID controls 227. HID controls are a data source or data sink associated with a HIDClass device. An example of a data source, or input control, is a button. An example of a data sink, or output control, is an LED. Control data is obtained and sent to a device by using HID reports.

As one of ordinary skill in the art will recognize, new computing scenarios are arising that require continuous (24×7) or instant availability of computing. Such scenarios include, but are not limited to, managing appliances and consumer electronics. Thus, an intelligent means of managing power consumption and fan noise while recognizing and handling events appropriately are necessary to match user expectations of turning a system off, minimizing user associated cost, and providing an environmentally friendly system (noise).

The present invention reduces overall power consumption and eliminates fan use (i.e., acoustic emissions) because low intensity tasks and operations may always be available by hosted them on the auxiliary system 202. For example, the conventional computer 110 provides the ability to play a digital audio file while editing a spreadsheet and monitoring email. However, if all that is required is playing an digital audio file, then the computer 110 has much more processing power than is necessary and is an excessive drain on electricity either from a power supply or battery. According to the present invention, the auxiliary system 202 could host the task of audio file playback and the primary system 201 can be turned off.

Additionally, the auxiliary system 202 may respond to events that need to be handled immediately, such as answering VoIP calls or security authorization checks, etc. This provides sufficient time to wake up the primary system 201 to handle events that are not as time critical, or that require the full resources of the primary system to handle.

The present invention is also useful for timer-based interaction. While the primary system 201 supports the concept of wake-on timer event, it may take 30 seconds or more to be brought up to a useful state. Therefore, in a digital video recorder (DVR) scenario, the primary system 201 would miss 30 seconds of record time if it were being sent a media stream for storage. However, the auxiliary system 202 enables bi-directional streaming processes and can be made available without the incumbent power supply or battery costs if this were enabled with the primary processor. The auxiliary system 202 may also make use of the same hardware assists for media encode/decode as the primary system 201. A related model of the present invention is to support a distributed data stream, such as re-routing a digital TV stream from a primary display to an auxiliary display, where the auxiliary display is physically associated with an auxiliary processor and runtime.

A further benefit is that the auxiliary system 202 operates even when the primary system 201 is in an "off" state of has faulted. Accordingly, the auxiliary system 202 can be used to monitor and interrogate the primary system 201 in the event of a problem in the primary system 201.

Figure 6:
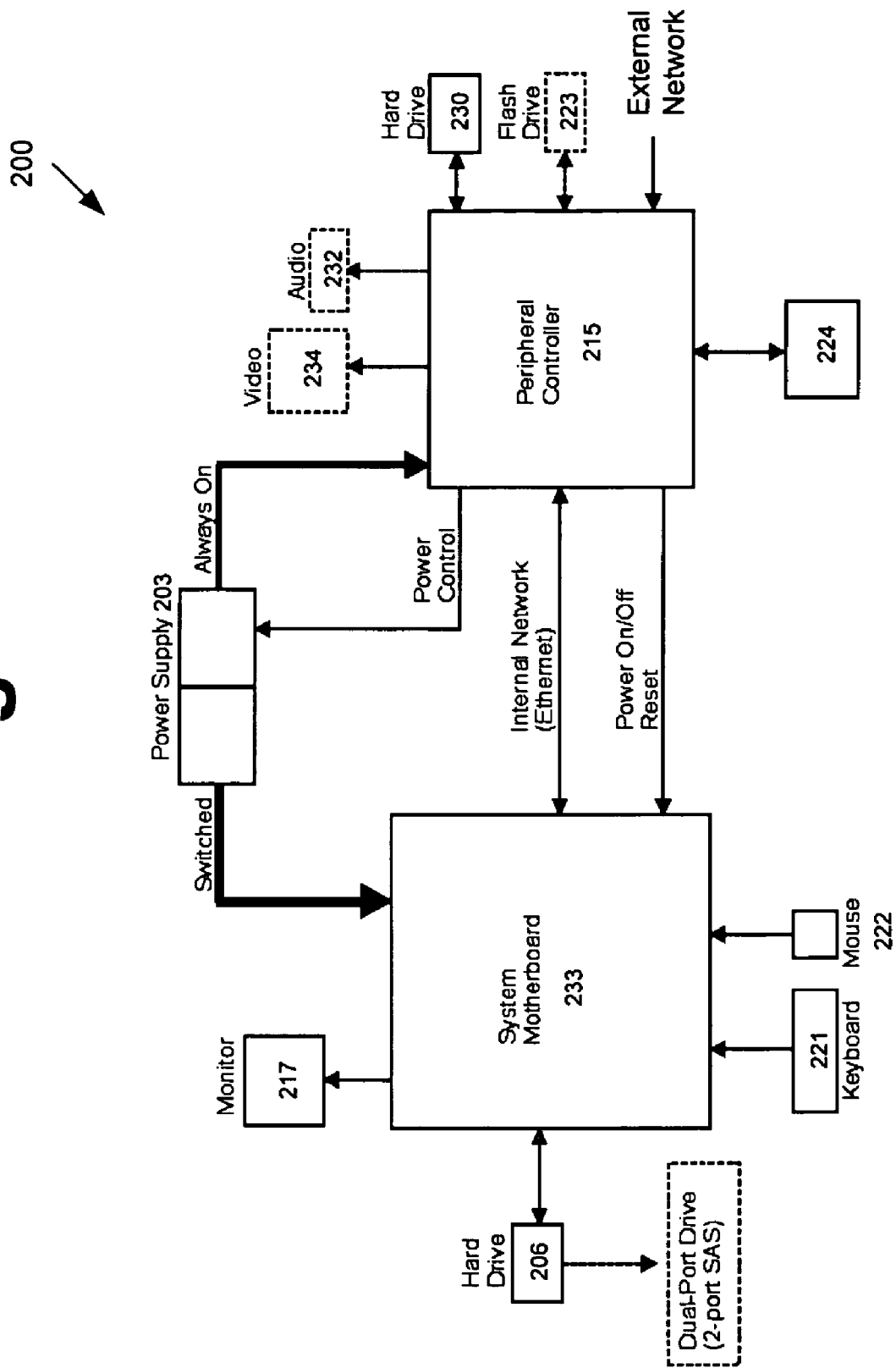
FIG. 6 is a block diagram of a system to share components using an internal LAN.

Referring now to FIG. 6, there is illustrated an embodiment wherein an internal LAN is used to share components. Each component may be addressed via its own Internet Protocol address. A system motherboard 233 may be connected to a peripheral controller 215 via an Ethernet Network. The motherboard 233 may address each of peripherals (e.g., user interface 224, video 234, audio 232, hard drive 230, flash memory drive 233) connected to the peripheral controller 215 via an Internet Protocol address.

The peripheral controller 215 is responsible for representing and mapping individual component identity and access for each component that it controls to an externally visible individual Internet Protocol address. It could be that there is a single IP address representing the peripheral controller, and when queried the peripheral controller could provided or publish a list of capabilities with addressing and or command details.

Figure 7:
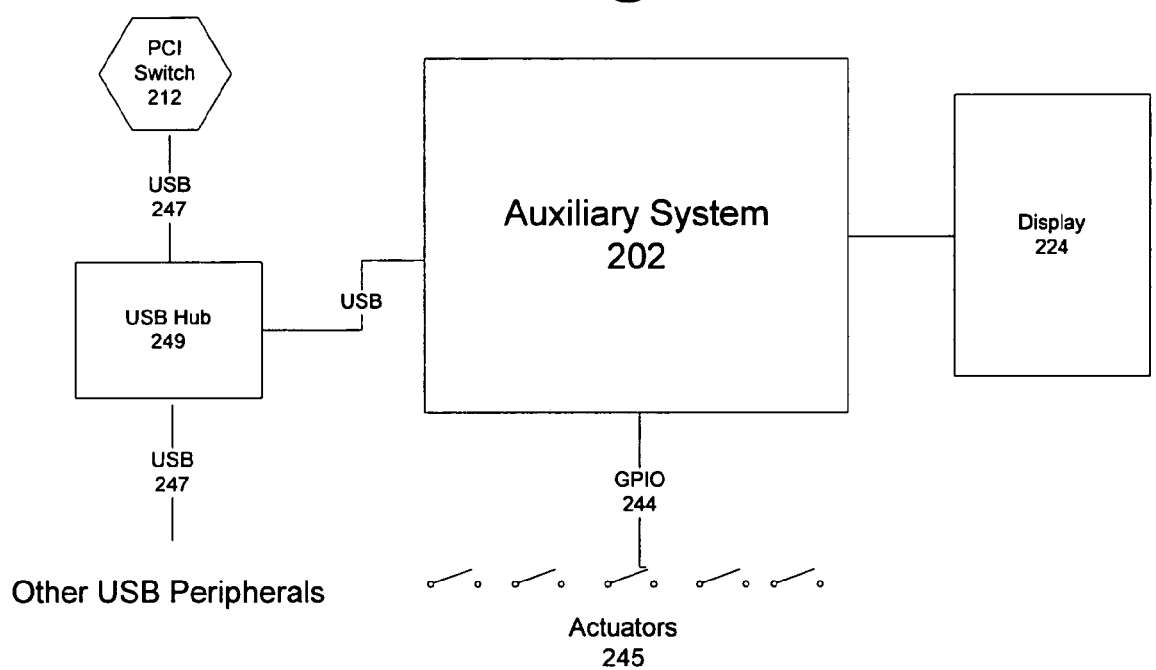
FIG. 7 is a block diagram of a system to share components using an USB hub architecture.

Referring now to FIG. 7, there is illustrated an embodiment wherein an a USB Hub architecture is implemented to make components available between multiple root complexes. Each root complex 201 and 202 sees the shared components as USB peripherals. This embodiment utilizes a modified USB Hub 249 that can switch between upstream lines for synchronous access of downstream components, similar to the PCI Express switch 212.

Figure 8:
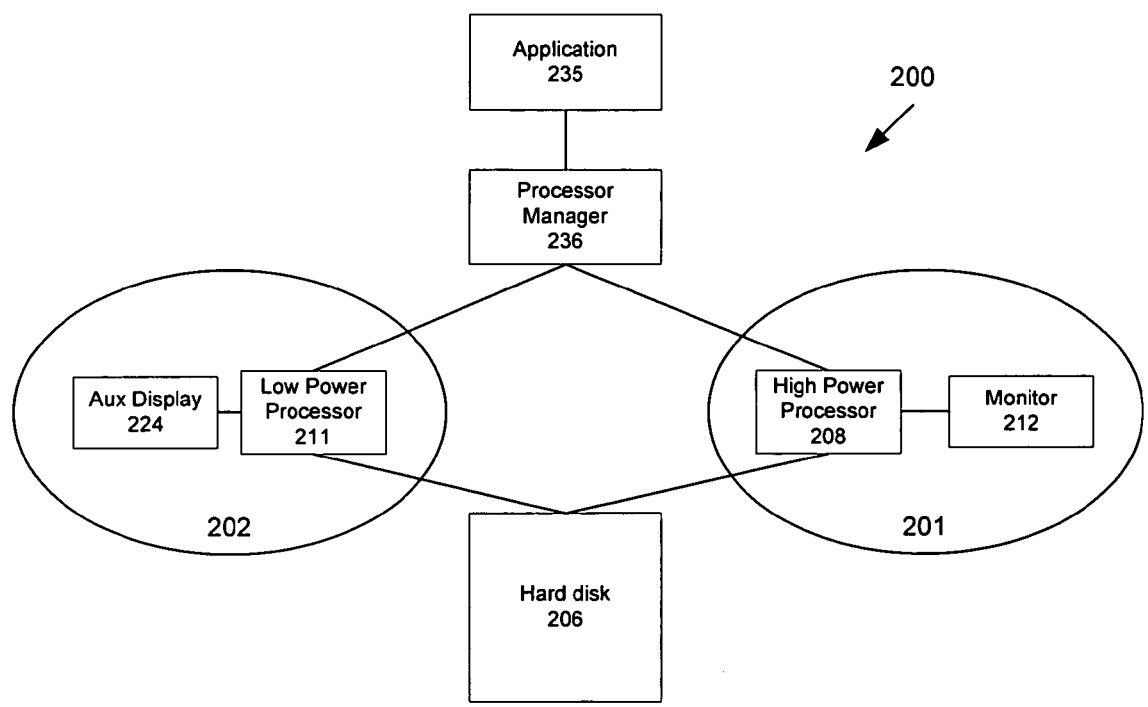
FIG. 8 is a block diagram of a system to load-balance applications between the primary system and the auxiliary system.

Referring to FIG. 8, there is illustrated another aspect of the present invention directed to load-balancing of services based on processing power consumption requirements. As an application 235 executes, a processor manager 236 determines a current system load (i.e., the load on the primary processor 208) and references an enumerated list of components (e.g., optical drive, disk drive, encoders/decoders, etc.) that are operating. Such a list may be derived from information contained in the task list. If the application 235 is a simple, low intensity task, the processor manager 236 shunts it to the auxiliary system 202. Whereas, if the application is a high intensity task, the processor manager 236 shunts it to the primary system 201. Furthermore, some applications may utilize resources of both processors. Also, it is possible to partition platforms and tasks to the appropriate processor and runtime for their execution. This load balancing provides a more efficient use of system resources.

The results of having this functionality in the processor manager 236 are the high power consumption components of a system can be completely powered down when low intensity applications are running. Both processors 208 and 211 can share the components of the PC architecture such as hard disk, input devices, etc. Applications 235 can be written using a single application model.

Referring now to FIG. 9, there is illustrated components connected via a "distributed" switch (shown as 237 and 238). Access by either the primary or auxiliary systems 201 and 202 is via this switch, it is as if the access was local to whichever processor is directing control. The two ends of the distributed switch connect to each other via any of a number of physical transports such as but not limited to IrDA, Bluetooth, and 802.11x.

While the present invention has been described in connection with the preferred embodiments of the various FIGS., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computing system, comprising:
   a primary computing system having a first CPU and a first memory;
   an auxiliary computing system having a second CPU and a second memory;
   a power supply connected to the primary and auxiliary computing systems;
   a command and control interface between said primary computing system and said auxiliary computing system; and
   a communication controller that switches predetermined ones of peripheral components between said primary computing system and said auxiliary computing system such that said peripheral components are shared between said primary computing system and said auxiliary computing system, wherein:
      each computing system comprises an application runtime;
      said communication controller is responsive to switch said predetermined ones of said peripheral components between said primary computing system and said auxiliary computing system in accordance with requirements to execute an application on a respective computing system; and
      low intensity tasks are hosted on the auxiliary computing system.

2. The computing system of claim 1, wherein data and notification sharing is performed via interprocess communication between said primary system and said auxiliary system, and wherein said auxiliary system is connected via a USB bus and treated as a USB peripheral by said primary system.

3. The computing system of claim 1, wherein said primary computing system and said auxiliary computing system each comprise a host controller connected to said communication controller to communicate with downstream devices.

4. The computing system of claim 3, wherein said communication controller comprises a PCI Express communication controller having an upstream PCI-to-PCI bridge for each of said primary computing system and said auxiliary computing system and downstream PCI-to-PCI bridges that connect to said components, and wherein said each upstream PCI-to-PCI bridge communicates to each downstream PCI-to-PCI bridge via an internal PCI bus.

5. The computing system of claim 4, wherein said communication controller comprises a bridge manager that retains an internal configuration control register to define which upstream PCI-to-PCI bridge each downstream PCI-to-PCI bridge is to respond to.

6. The computing system of claim 5, wherein said components are simultaneously shared between said primary computing system and said auxiliary computing system via said communication controller.

7. The computing system of claim 1, wherein said auxiliary computing system provides timer-based interaction, and wherein said auxiliary computing system wakes said primary computing system in response to an event.

8. The computing system of claim 1, wherein said auxiliary computing system is a low-power system and wherein said auxiliary system is adapted to run applications when said primary system is unavailable.

9. The computing system of claim 1, wherein said communication controller comprises an internal LAN and wherein said peripheral components are addressed via an Internet Protocol address of the LAN.

10. The computing system of claim 1, wherein said communication controller comprises a distributed switch, and wherein said peripheral components are accessed by either said primary computing system or auxiliary computing system is via said distributed switch as if access was local.

11. The computing system of claim 1, wherein peripheral components that are not enable to enter a standby state are power managed by said auxiliary computing system.

* * * * *